US006995852B1

(12) United States Patent
Urasawa

(10) Patent No.: US 6,995,852 B1
(45) Date of Patent: Feb. 7, 2006

(54) PRINTING DATA PROCESSOR WHICH MANAGES MEMORY

(75) Inventor: Koji Urasawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/458,605

(22) Filed: Dec. 10, 1999

(30) Foreign Application Priority Data

Dec. 22, 1998 (JP) ................................ 10-363632

(51) Int. Cl.
*G06K 15/02* (2006.01)
*G06F 13/00* (2006.01)

(52) U.S. Cl. .................... 358/1.15; 358/1.14; 358/1.13

(58) Field of Classification Search ................. 358/1.9, 358/1.13, 1.15, 1.14, 1.16, 1.17, 1.18, 524, 358/537, 512, 527
See application file for complete search history.

(56) References Cited

U.S. PATENT DOCUMENTS 5,652,711 A * 7/1997 Vennekens .................. 364/514
5,987,226 A * 11/1999 Ishikawa et al. ............ 395/112
6,018,400 A * 1/2000 Blair .......................... 358/1.9
6,052,203 A * 4/2000 Suzuki et al. ................ 358/1.9
6,120,197 A * 9/2000 Kawamoto et al. ........... 400/61
6,219,149 B1 * 4/2001 Kawata et al. ............. 358/1.15
6,490,055 B1 * 12/2002 Shimizu ..................... 358/1.9
6,493,099 B2 * 12/2002 Nakagiri .................... 358/1.13
6,515,763 B1 * 2/2003 Dermer et al. ............... 358/1.9

* cited by examiner

*Primary Examiner*—Douglas Q. Tran
(74) *Attorney, Agent, or Firm*—Akin Gump Strauss Hauer & Feld, LLP

(57) ABSTRACT

To reduce the amount of memory used and process time in an expansion process, an editing process part (1) is used to select a mode of reproduction of page state. Before printing data of intermediate form is stored in an intermediate-form printing data memory (6), a register process part (4) included in an editing process part (1) analyzes the data and detects in what page state the data is reproduced on paper. The page state is converted into page state data and added to printing data of intermediate form. Therefore, an expansion process part (21) at the next stage performs the expansion process on the basis of page state data and therefore need not secure an assumed maximum amount of memory used for the expansion process.

21 Claims, 18 Drawing Sheets

*Fig.3*

| | BINARY(1BIT) | MULTI BINARY(8BITS) |
|---|---|---|
| MONOCHROME | 1 | 8 |
| COLOR(CMYK,4COLORS) | 4 | 32 |

DIAGRAM FOR EXPLAINING BITS IN MONOCHROME AND COLOR(CMYK,4COLORS)PRINTING

Fig.4(a)

CONDITIONS GIVING RISE TO STATE TRANSITION ACCORDING TO CHARACTERISTICS OF DATA

| | CHARACTERISTICS | CONDITIONS FOR STATE TRANSITION |
|---|---|---|
| (1) | DATA SPECIFIES SHAPE ONLY | DATA INCLUDES NO INFORMATION ABOUT COLOR AND GRADATION, SO NO STATE TRANSITION OCCURS. STATE TRANSITION NEED NOT BE CHECKED. |
| (2) | DATA SPECIFIES COLOR ONLY. | IF COLOR IS SPECIFIED AS BLACK, COLOR INFORMATION IS NOT INCLUDED. SO, STATE TRANSITION NEED NOT OCCUR.<br>IF COLOR COMPONENTS(E. G. CMY) ARE SAME, THAT IS,<br>IF COLOR IS A GRAY TONE, STATE CHANGES TO MULTI BINALY BUT NEED NOT CHANGE TO COLOR. IN OTHER CASES, STATE CHANGES TO COLOR MULTI BINARY. |
| (3) | DATA SPECIFIES COLOR AND SHAPE. | IF COLOR SPACE IS COLOR, STATE CHANGES TO COLOR, IF NUMBER OF BITS IS MORE THAN 1, STATE CHANGES TO COLOR MULTI BINARY. |
| (4) | DATA SPECIFIES NO COLOR NOR SHAPE. | IF NEITHER COLOR NOR SHAPE IS SPECIFIED, DATA INCLUDES NO INFORMATION ABOUT COLOR AND GRADATION, SO NO STATE TRANSITION OCCUR. STATE TRANSITION NEED NOT BE CHECKED. |

*Fig.4(b)*

| COMPONENT | CHARACTERISTICS | REMARKS |
|---|---|---|
| DRAWING DATA | SPECIFIES SHAPE ONLY | CHARACTER, GRAPHIC FORM, ETC. |
| | SPECIFIES COLOR AND SHAPE | IMAGE ETC. |
| PATTERN | SPECIFIES COLOR ONLY | PEN COLOR , ETC. |
| | SPECIFIES SHAPE ONLY | TILING PATTERN, ETC. |
| | SPECIFIES COLOR AND SHAPE | TILING PATTERN, ETC. |
| EXPANSION RULE | NO COLOR, NO SHAPE | |

DIAGRAM FOR EXPLAINING PAGE STATE

Fig. 9

| ORDER | PAGE | SHEET OF PAPER | FRONT/REVERSE |
|---|---|---|---|
| 1 | 2 | 1ST | REVERSE |
| 2 | 4 | 2ND | REVERSE |
| 3 | 1 | 1ST | FRONT |
| 4 | 6 | 3RD | REVERSE |
| 5 | 3 | 2ND | FRONT |
| 6 | 8 | 4TH | REVERSE |
| 7 | 5 | 3RD | FRONT |

DIAGRAM FOR EXPLAINING PRINTING ON BOTH SIDES

TRANSITION 1 PAGE STATE THIS TIME IS MONOCHROME AND NEXT PAGE STATE IS MONOCHROME

TRANSITION 2 PAGE STATE THIS TIME IS COLOR AND NEXT PAGE STATE IS COLOR

TRANSITION 3 PAGE STATE THIS TIME IS COLOR

*Fig.16*

| CURRENT PRINTING SPEED | PAGE STATE THIS TIME | | NEXT PAGE STATE | PRINTING SPEED THIS TIME | TRANSITION MODE |
|---|---|---|---|---|---|
| PRINTER STOPPAGE 41 | MONOCHROME | (1) | MONOCHROME | MONOCHROME | 1 |
| | | (2) | COLOR | COLOR | 2 |
| | COLOR | (3) | MONOCHROME | COLOR | 2 |
| | | (4) | COLOR | COLOR | 2 |
| MONOCHROME 42 | MONOCHROME | (5) | MONOCHROME | MONOCHROME | NO TRANSITION |
| | | (6) | COLOR | MONOCHROME | NO TRANSITION |
| | COLOR | (7) | MONOCHROME | COLOR | 3 |
| | | (8) | COLOR | COLOR | 3 |
| COLOR 43 | MONOCHROME | (9) | MONOCHROME | MONOCHROME | 1 |
| | | (10) | COLOR | COLOR | NO TRANSITION |
| | COLOR | (11) | MONOCHROME | COLOR | NO TRANSITION |
| | | (12) | COLOR | COLOR | NO TRANSITION |

DIAGRAM FOR EXPLAINING DECISION ON PRINTING SPEED

PRINTING DATA PROCESSOR WHICH MANAGES MEMORY

BACKGROUND OF THE INVENTION

1. Field of the Invention

The present invention relates to a printing data processor for use with a printer.

2. Related Art

Generally, a printer receives from a host, such as a personal computer, printing data written in a page description language (hereafter referred to as PDL). A PDL includes drawing data, patterns and an expansion rule. By combining those three components, various kinds of pages are described.

More specifically, by combining descriptions of all components, data on the state or mode of printing is reproduced, such as color or monochrome, whether a binary or multi binary (or multi-value) monochrome image is printed, and whether on one side or on both sides of paper.

The printing data processor installed in the printer converts printing data in PDL form into printable data, such as bit images, to be printed on paper.

Printing data in a bit image, converted from printing data in PDL form, is supplied by the printing data processor. Here, the amount of memory used to store the supplied printing data greatly differs with the states of printing. For example, in color printing, memory four times greater than in monochrome printing is used. Therefore, processing time to obtain printing data in bit image form differs considerably.

The printing data processor performs a two-stage operation of an editing process and an expansion process on printing data in PDL form, to expand printing data to a printable bit image form. More specifically, printing data in PDL form is edited by the editing process and becomes printing data in intermediate form called a display list, for example. After this, printing data in this intermediate form is expanded by the expansion process to become printing data in bit image form for printing.

Meanwhile, in the prior art, there has been problems that require solution as described in the following.

The conventional printing data processor, before expanding printing data in PDL form to printable printing data, was unable to make a selection of, for example, whether to reproduce data on paper by color printing or by monochrome printing.

Therefore, before the expansion process it has been necessary to secure a maximum possible amount of memory to use. Another problem is that when color printing is selected, it requires longer processing time than monochrome printing, which results in decreases in the printing efficiency of the printer.

SUMMARY OF THE INVENTION

An object of the present invention is to provide a printing data processor which enables a reduction in the amount of memory used in the expansion process.

Another object of the present invention is to provide a printing data processor that can reduce processing time and improve the printing efficiency of the printer.

Yet another object of the present invention is to realize efficient printing by adjusting timing of the expansion process.

To solve the above problems and achieve the above objects, the present invention has adopted the following configurations.

According to an aspect of the present invention, a printing data processor comprises an editing process part for receiving printing data in the form of a page description language from a host and editing the received printing data in an intermediate form between the form of a page description language and a printable bit image form; an intermediate-form printing data memory for storing printing data of the intermediate form; and an expansion process part for expanding printing data of the intermediate form to the bit image form, wherein said editing process part includes a register process part for analyzing printing data of the intermediate form edited page by page to detect its page state to be printed and adding page state data of each page to printing data of the intermediate form edited page by page.

According to a further aspect of the present invention, the editing process part further includes a decoding process part separating printing data from the host command by command, and a command process part performing preprocessing to each command from the decoding process part.

According to a further aspect of the present invention, the printing data of the intermediate form is printing data expressed in display list form.

According to yet another aspect of the present invention, in a printing data processor, a readout part is provided which reads the page state data to control a printing operation according to the page state data added to the printing data to be stored in the register process part.

According to a still further aspect of the present invention, in a printing data processor, the editing process part includes a page state storage area to which the page state data detected by the register process part is sent page after page, and final page state data of each page stored in the page state storage area is added to printing data of the intermediate form.

According to an additional aspect of the present invention, in a printing data processor, the page state data added to printing data of the intermediate form is of the same intermediate form as printing data of the intermediate form.

According to another aspect of the present invention, in a printing data processor, the expansion process part includes a plurality of usagewise-separated register process parts for respective reproduction modes of respective pages, and a selection process part for selecting a usagewise-separated register process part suitable for the page state from the plurality of usagewise-separated register process parts according to the page state data.

According to a still further aspect of the present invention, a printing data processor comprises a system management part for deciding timing of expanding printing data of the intermediate form to printing data of the bit image form, and a bit image printing data memory for storing printing data of the bit image form. The system management part decides the amount of memory used to expand each piece of printing data of the intermediate form to printing data of the bit image form for each page according to the page state data at printing on both sides or at printing of multi-page copies, and selectively stores printing data in the intermediate-form printing data memory and in the bit image printing data memory according to the amount of the memory used.

According to an additional aspect of the present invention, in a printing data processor, the system management part, when it makes a decision that the amount of memory used with printing data of the intermediate form is relatively large, stores the printing data in the state of intermediate form in the intermediate-form printing data memory, and when it makes a decision that the amount of memory used is relatively small, stores the printing data, expanded to the bit image form, in the bit image printing data memory.

According to yet another aspect of the present invention, a printing data processor comprises a printing speed decision part for changing the printing speed of pages printed continuously, wherein the printing speed decision part decides the printing speed of pages printed, from the page state of a page to be printed and from the page state of another page immediately afterwards according to a predetermined decision rule.

BRIEF DESCRIPTION OF THE DRAWINGS

FIG. 3 is a diagram for explaining bits in monochrome and color printing;

FIG. 4(*a*) and FIG. 4(*b*) are diagrams for explaining page state;

FIG. 9 is a diagram for explaining printing on both sides;

FIG. 16 is a diagram for explaining decision on printing speed;

DESCRIPTION OF PREFERRED EMBODIMENTS

The present invention will be described in detail referring to embodiments depicted in the accompanying drawings.

First Embodiment

Figure 1:
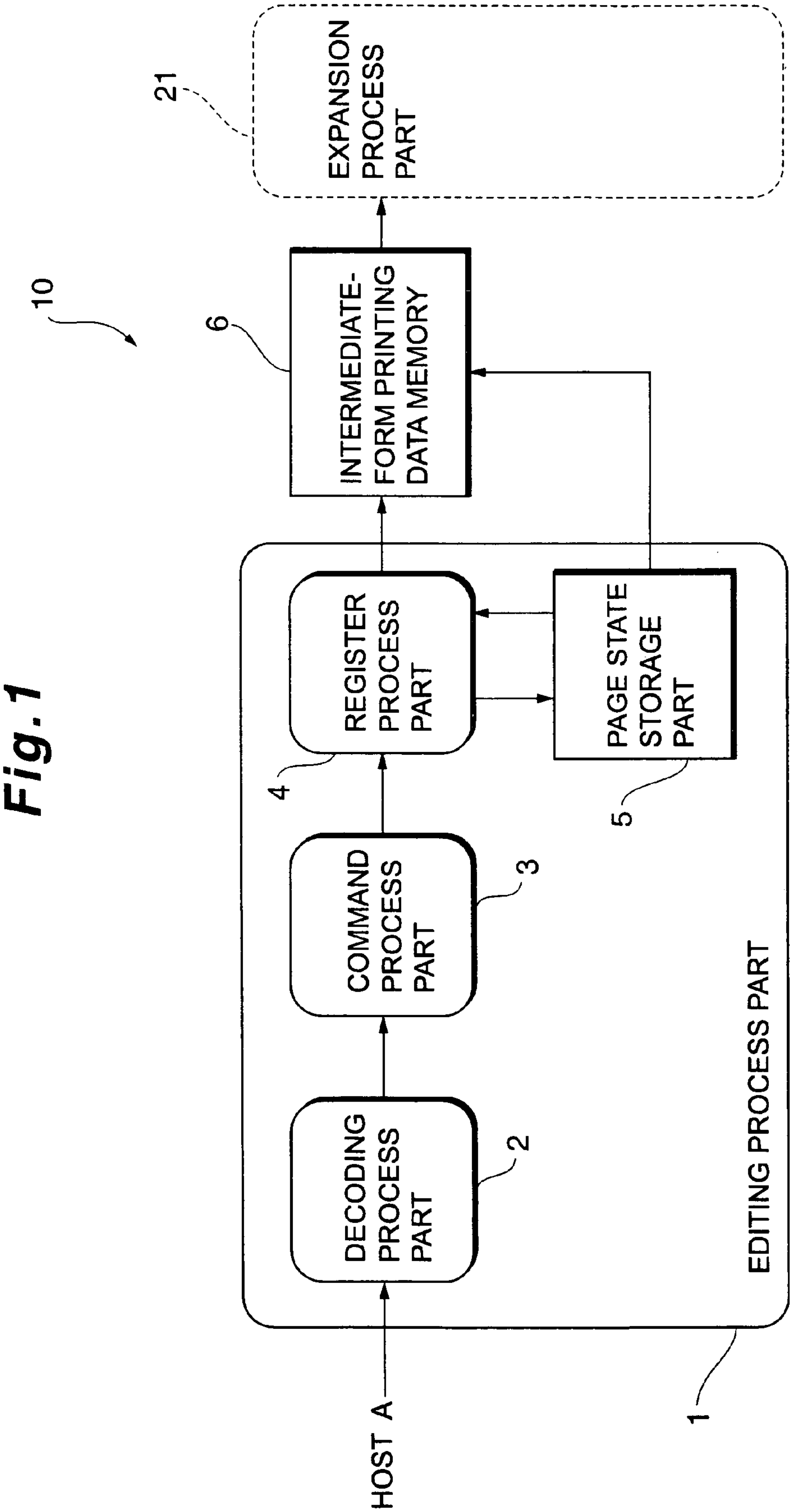
FIG. 1 is a block diagram of a printing data processor according to a first embodiment.

FIG. 1 is a block diagram of a printing data processor 10 according to a first embodiment of the present invention.

Prior to description referring to FIG. 1, brief description will be made of the flow of printing data to be processed by the printing data processor.

Figure 2:
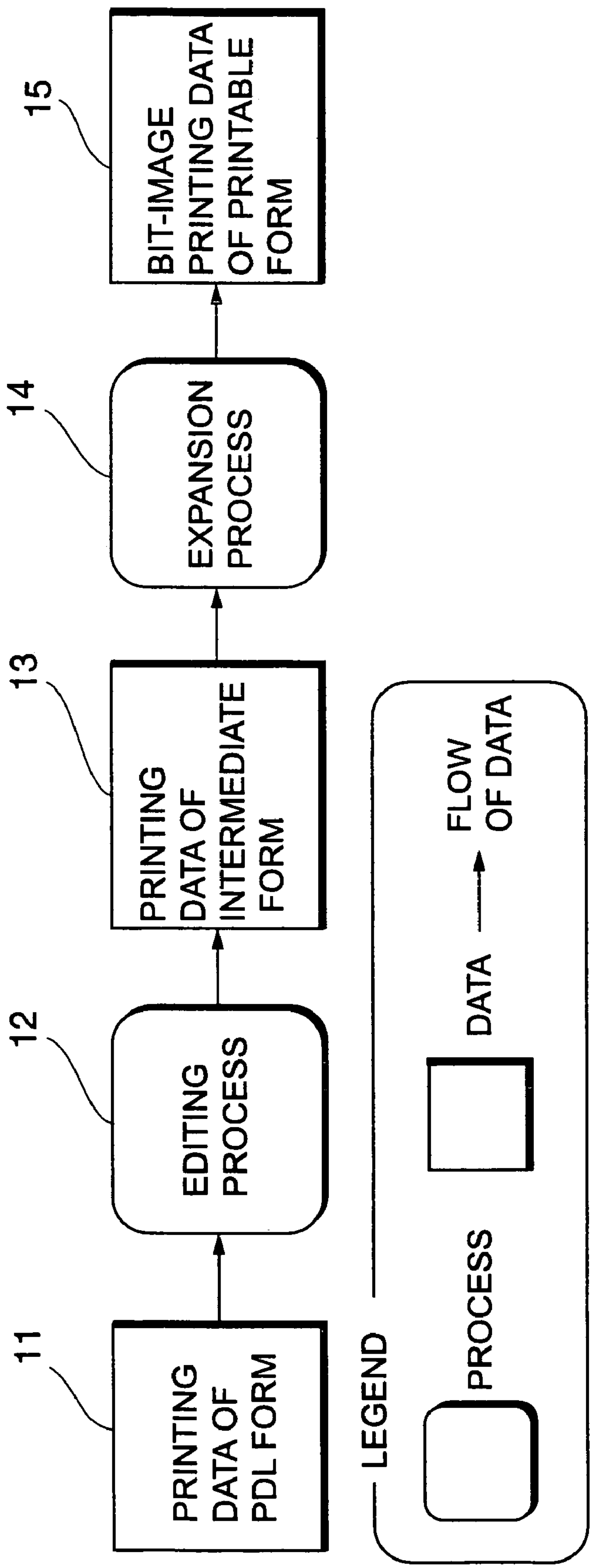
FIG. 2 is a diagram for explaining the flow of printing data.

FIG. 2 is an explanation diagram of the flow of printing data.

As shown in FIG. 2, a printing data processor 10 according to the present invention receives printing data 11 of PDL form from a host A (See FIG. 1). Printing data 11 of PDL form is edited by an editing process part 12 and temporarily becomes printing data 13 of intermediate form called a display list, which is not dependent on the kind of PDL. Printing data 13 of intermediate form is expanded by an expansion process 14 to printing data of printable bit image form.

As has been described, the amount of memory used for the editing process greatly differs with the mode of reproduction, in other words, with the page printing mode. An example will be described with reference to drawings.

FIG. 3 is an explanation diagram of bits in monochrome and color printing (CMYK, 4 colors).

As shown in FIG. 3, in the case of monochrome binary printing, a pixel of an image, for example, is specified by one bit. On the other hand, in the case of color (CMYK, 4 colors) multi binary (8 bits) printing, for a pixel of an image as printing data, 4 colors are specified with 4 bits. The levels of each color are specified with 8 bits. Therefore, a total of 32 bits are used to specify color printing data. In other words, the amount of memory used in the expansion process greatly differs with different modes of reproduction.

The present invention has as its object to perform the selection of the mode of reproduction in the step of the editing process 12 (See FIG. 2) to reduce the amount of memory used and processing time in the expansion process. To achieve this object, an editing process part 1 has functions, which are described below, to execute the editing process 12 mentioned above (FIG. 2).

The editing process part 1 converts printing data 11 of PDL form into printing data 13 of intermediate form (FIG. 2), and then performs data analysis on printing data in the intermediate form. The editing process part 1 detects necessary factors for selection of a reproduction mode, such as whether printing is color or monochrome and so on from results of data analysis. Those factors are referred to as page state.

The detected page state is expanded by the editing process part 1 to page state data and is added to printing data 13 of intermediate form. The expansion process part at the subsequent stage carries out the expansion process 14 (FIG. 2) on the basis of page state data. The amount of memory used necessary for the expansion process is secured according to base condition data. Therefore, the minimum necessary amount of memory has only to be secured.

The printing data processor 10 according to the first embodiment of the present invention includes the editing process part 1 that has the functions mentioned above. A printing data processor according to a second embodiment includes this editing process part 1 and the expansion process part 21. Let us move on to detailed description as follows.

Returning to FIG. 1, description will be made of a processor configuration according to the first embodiment.

The printing data processor 10 according to the present invention is installed in the printer controller. FIG. 1 shows function blocks of the data processor 10. In this example, those function blocks can be realized by modules and objects having the functions corresponding to those in a program in the microprocessor.

The data processor 10 according to this embodiment comprises the editing process part 1, which has a decoding process part 2, a command process part 3 and a register process part 4, and also comprises an intermediate-form printing data memory 6.

The decoding process part 2 receives printing data of PDL form from a host, and separates commands from one another, and specifies drawing data, patterns and an expansion rule mentioned above.

The command process part 3 executes processes specific to commands provided in PDL. More specifically, the command process part 3 converts printing data in PDL form into a vector or bit data form, for example, which is not dependent on the kind of PDL language by way of preprocessing before converting printing data from PDL form into intermediate form.

The register process part 4 receives printing data, which has undergone preprocessing in the command process part 3, and edits printing data to convert to an intermediate form. Further, the register process part 4 stores printing data of the intermediate form in the intermediate-form printing data memory 6. At the same time, the register process part 4 analyzes data to store, and detects the page state. In addition, the register process part adds final page state of each page as data in intermediate form to printing data of intermediate form.

In the example in FIG. 1, page state data of each page including states of the respective portions of a page, such as whether printing is monochrome or color on a certain line in the page for example, is sequentially written in the page state storage area. The final page state after changes in state of each page by rewriting of information is transferred to the page state storage area 5 and added to printing data in the intermediate form. Changes in page state data stored in the page state storage area will be described in detail later by referring to drawings.

The intermediate-form printing data memory 6 stores both printing data of the intermediate form and its final page state data of each page.

Description will next be made of changes in page state data to be stored in the page state data memory 5.

FIG. 4 is a diagram for explaining page state.

The table (a) is a classification table in which page states are classified and the table (b) is an explanation diagram that shows page states that occur with each component of PDL.

As shown in the table (a), the page states, that is, the shapes and colors of an image to be reproduced on paper are classified into four kinds: only shape is specified (1), only color is specified (2), shape and color are specified (3), and neither color nor shape is specified (4).

According to the table (b), from the relation with components of PDL, (1) denotes a condition that occurs in character shape in drawing data and tiling pattern in patterns, or the like, (2) denotes a condition that occurs in pen color of patterns, or the like, (3) denotes a condition that occurs in image in drawing data and tiling pattern in patterns, and (4) denotes a condition that occurs in expansion rule, for example.

Figure 5:
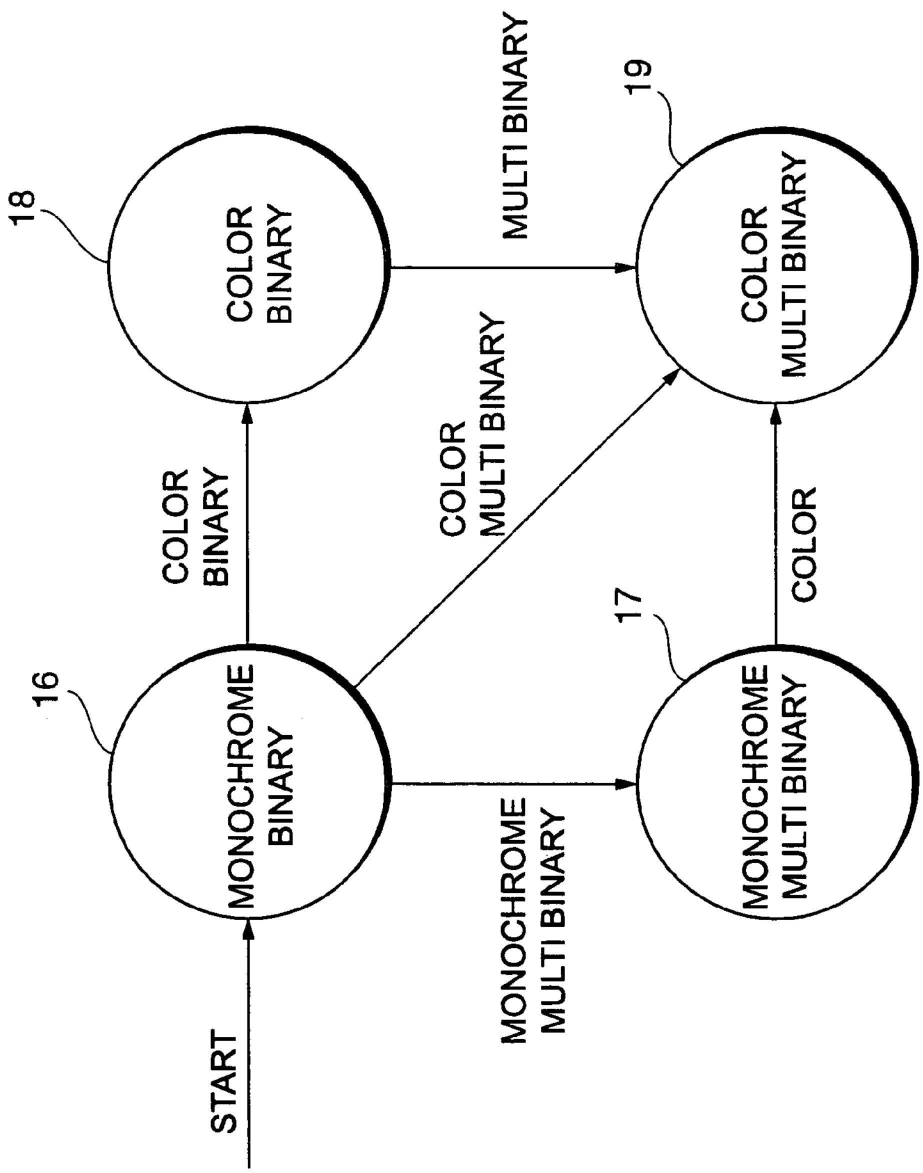
FIG. 5 is a page state transition diagram.

FIG. 5 is a page state transition diagram of page state.

FIG. 5 explains an example of transitions of page state that the register process part 4 detects on a given page.

The register process part 4 in initialized state is set to monochrome binary 16. The register process part 4 receives printing data of intermediate form from the command process part 3 as information for one line of a given page, for example. The register process part 4 analyzes the printing data of intermediate form and detects page state of that line. When that data is data to specify shape only ((1) in FIG. 4) and has been designated in binary form, the page state does not change and stays at binary 16. Therefore, the state does not change in response to reception of data that specifies shape only, and the page state data to be stored in the page state storage area 5 is held to monochrome binary 16.

When the register process part 4 receives printing data of intermediate form as subsequent information from the command process part 3, though printing data at that portion specifies color only ((2) in FIG. 4), if the color is specified as black, color information is not included. Therefore, the page state in the register process part 4 does not change and the page state storage area 5 holds page state data of monochrome binary 16 as it is.

However, if the color components (cyan, magenta, and yellow for example) are specified as same, that is, if the color is a gray tone, the page state of that portion in the register process part 4 changes to monochrome multi binary 17. Therefore, page state data to be stored in the page state storage area 5 changes to monochrome multi binary 17.

When the page state of that portion is color binary, the page state data to be stored in the page state storage area 5 changes from monochrome binary 16 to color binary 18. When color multi binary is specified, the page state to be stored in the page state storage area 5 changes from monochrome binary 16 to color to color multi binary 19. When color and shape are specified ((3) in FIG. 4) and the color space is color binary, the page state changes from monochrome binary 16 to color multi binary 18. Similarly, when the color space is color multi binary, the page state changes to color multi binary 19.

However, when the page state of a given page is checked and color or monochrome multi binary is detected which requires a larger amount of information than monochrome binary, if the detection result of the page state of a subsequent portion on that page is neither color nor shape ((4) in FIG. 4), for example, the page state does not change, the page state data to be stored in the page state storage area 5 is held to color or monochrome multi binary which requires a larger amount of information than monochrome binary.

Therefore, the page state storage area 5 holds in non-reversible manner page state data that requires the greatest amount of information from detection results of page state of respective portions of each page. This final data of each page is added to printing data of intermediate form.

The description of the configuration and the functions is finished and the operation will be described.

Figure 6:
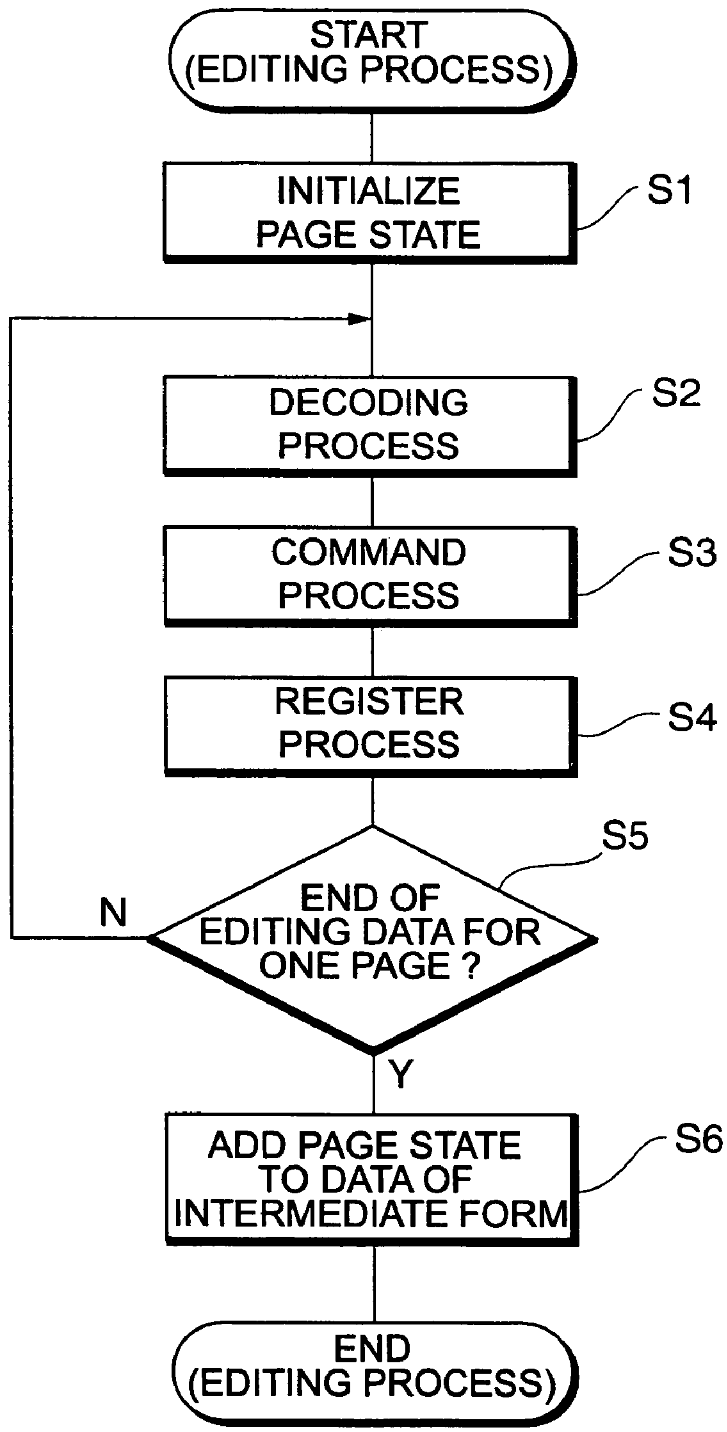
FIG. 6 is a diagram for explaining the operation of the printing data processor according to the first embodiment.

FIG. 6 is a diagram for explaining the operation of the printing data processor 10 according to the first embodiment.

The operation of the data processor 10 according to the first embodiment will be described by following steps S1 to S6 in FIG. 6.

Step S1:

In the register process part 4 (FIG. 1), the page state is initialized to monochrome binary 16 (FIG. 5).

Step S2:

The decoding process part 2 (FIG. 1) receives printing data of PDL form from a host. The printing data is separated command by command, and commands are transferred to the command process part 3 (FIG. 1).

Step S3:

The command process part 3 (FIG. 1) receives printing data of PDL form, performs preprocessing specific to each command, and transfers the command to the register process part (FIG. 1).

Step S4:

The register process part 4 (FIG. 1) edits printing data, received from the command process part (FIG. 1), to provide printing data of intermediate form, and stores the printing data in the intermediate-form printing data memory 6 (FIG. 1). At the same time, the register process part 4 analyzes data to store, and detects state transition of page state. The register process part 4 edits the state transition of the page state to provide page state data.

Step S5:

When printing data of PDL form for one page has all been edited and printing data of intermediate form has been provided, the routine proceeds to Step S6. But, if there remains some portion of the page which is not yet edited to provide printing data of intermediate form, the routine returns to Step S2, and steps S2 to S5 are repeated.

Step S6:

The register process part 4 (FIG. 1) shows the state transitions mentioned above according to page state data for one page that changes in succession, and the register process part 4 holds the above-mentioned final page state data in the page state storage area 5 and adds the final page state in intermediate form to printing data of intermediate form in the intermediate-form printing data memory 6 (FIG. 1), with which the register process part 4 terminates the editing process.

In the foregoing description, the transitions of page state are limited as an example to monochrome binary 16 (FIG. 5), monochrome multi binary 17 (FIG. 5), color binary 18 (FIG. 5) and color multi binary (FIG. 5). However, the present invention is not limited to this example. In other words, it is possible to manage the operation using two states of monochrome and color and furthermore it is possible to manage the operation by using 2 bits, 4 bits and 8 bits as different states.

In the first embodiment, the different processes of the data processor have been described as function blocks of a program in the printer controller, but this embodiment is not limited to such an example, in other words, those function blocks may be constructed individually by hardware.

As has been described, because the register process part 4 adds and stores page state data in the intermediate-form printing data memory 6, the following effects can be obtained.

It becomes possible to select a reproduction mode of printing data at the stage that printing data in PDL form has been edited to an intermediate form. As the result, in the subsequent expansion process, the minimum necessary amount of memory has only to be secured in the subsequent expansion process.

Second Embodiment

A printing data processor according to a second embodiment comprises an editing process part 1 (FIG. 1) and an intermediate-form printing data memory 6 (FIG. 1), which are the same as those described with reference to the first embodiment. The printing data processor further comprises a plurality of expansion process parts.

The printing data processor according to the second embodiment selects one expansion process part suitable for a reproduction mode of printing data on the basis of page state data from the plurality of expansion process parts. Printing data of PDL form is expanded by the selected expansion process part to printing data of printable form. This printing data processor is described in detail as follow.

Figure 7:
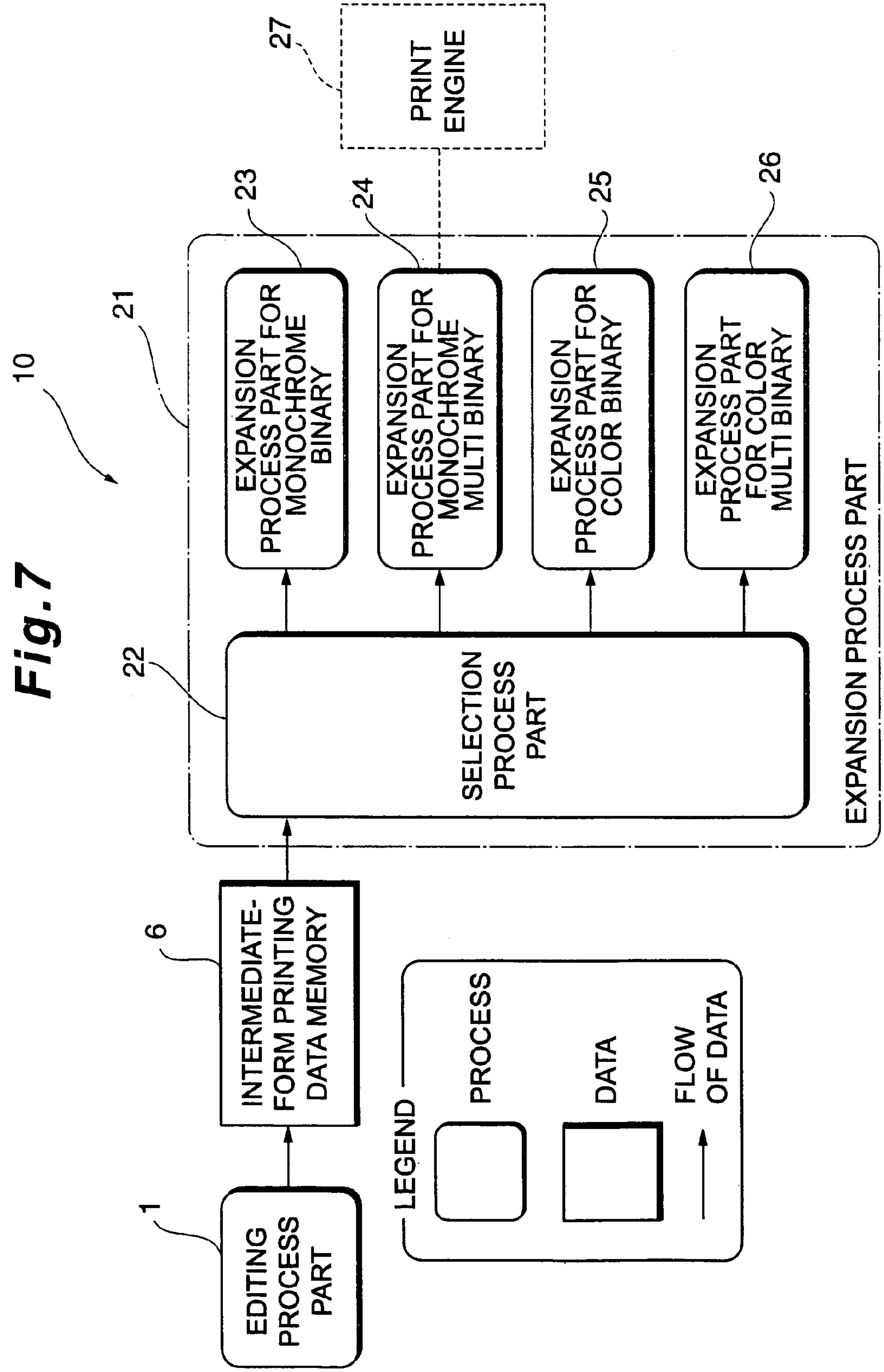
FIG. 7 is a block diagram of a printing data processor according to a second embodiment.

FIG. 7 is a block diagram of the printing data processor 10 to show the second embodiment.

The printing data processor 10 in FIG. 7 is installed in the printer controller of a printer and illustrated by using separate function blocks. In this example, those function blocks are realized by modules and objects having the functions corresponding to those in a program in the microprocessor.

The printing data processor according to the second embodiment shown in FIG. 7 comprises an editing process part 1, an intermediate-form printing data memory 6, and an expansion process part 21. The expansion process part 21 includes a selection process part 22 and further includes an expansion process part 23 for monochrome binary, an expansion process part 24 for monochrome multi binary, an expansion process part 25 for color binary and an expansion process part 26 for color multi binary, which are provided for different purposes of use according to page states.

The editing process part 1 and the intermediate-form printing data memory 6 are exactly the same as those in the first embodiment and therefore their descriptions are omitted.

The selection process part 22 receives and holds page state data from the intermediate-form printing data memory 6, and reads out the page state data, and according to read-out data, selects an expansion process part suitable for a reproduction mode of printing data from among the expansion process part 23 for monochrome binary, the expansion process part 24 for monochrome multi binary, the expansion process part 25 for color binary, and the expansion process part 26 for color multi binary.

The expansion process part 23 for monochrome binary receives printing data of intermediate form from the intermediate-form printing data memory 6, and expands the printing data to monochrome binary printing data.

The expansion process part 24 for monochrome multi binary receives printing data of intermediate form from the intermediate-form printing data memory 6, and expands the printing data to monochrome multi binary printing data.

The expansion process part 25 for color binary receives printing data of intermediate form from the intermediate-form printing data memory 6, and expands the printing data to color binary printing data.

The expansion process part 26 for color multi binary receives printing data of intermediate form from the intermediate-form printing data memory 6, and expands the printing data to color multi binary printing data.

The description of the data processor according to the second embodiment has been finished and description will now proceed to its operation as follows.

Figure 8:
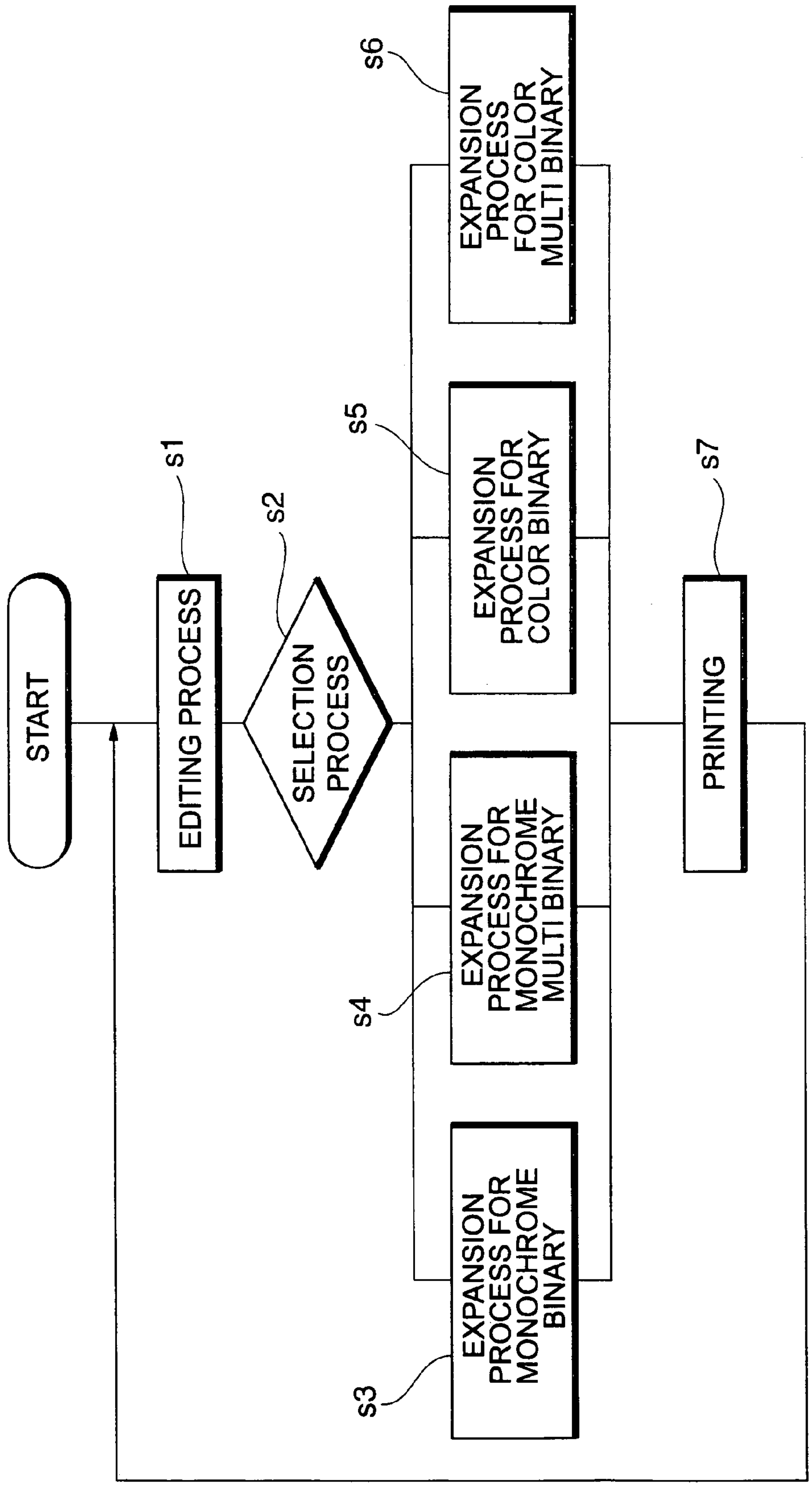
FIG. 8 is a diagram for explaining the operation of the printing data processor according to the second embodiment.

FIG. 8 is a diagram for explaining the operation of the printing data processor according to the second embodiment.

The operation of the printing data processor 10 according to the second embodiment will be described by following steps s1 to s7 in FIG. 8.

Step s1:

This step indicates the whole operation of the first embodiment in a reduced-size shape. As described above in the first embodiment, this process receives printing data of PDL form from a host, edits it to printing data of intermediate form, and stores the obtained data in intermediate form together with page state data in the intermediate-form printing data memory 6.

Step s2:

The selection process part 22 (FIG. 7) receives printing data expressed in intermediate form and page state data from the intermediate-form printing data memory 6. The selection process part or readout part 22 (FIG. 7) selects a reproduction mode of printing data on the basis of page state data. When monochrome binary is selected as the reproduction mode of printing data, the routine proceeds to Step s3. When monochrome multi binary is selected as the reproduction mode of printing data, the routine goes on to Step s4. When color binary is selected as the reproduction mode of printing data, the process goes to Step s5. When color multi binary is selected as the reproduction mode of printing data, the routine proceeds to Step s6.

Step s3:

The expansion process part 23 for monochrome binary (FIG. 7) receives printing data of intermediate form from the intermediate-form printing data memory 6 (FIG. 7), and expands the printing data to monochrome binary printing data.

Step s4:

The expansion process part 24 for monochrome multi binary (FIG. 7) receives printing data of intermediate form from the intermediate-form printing data memory 6 (FIG. 7), and expands the printing data to monochrome multi binary printing data.

Step s5:

The expansion process part 25 for color binary (FIG. 7) receives printing data of intermediate form from the intermediate-form printing data memory 6 (FIG. 7), and expands the printing data to color binary printing data.

Step s6:

The expansion process part 26 for color multi binary (FIG. 7) receives printing data of intermediate form from the intermediate-form printing data memory (FIG. 7), and expands the printing data to color multi binary printing data.

Step s7:

A print engine, a unit subordinate to the printing data processor according to the second embodiment, receives printing data expanded by any one of Steps s3 to s6, and reproduces images, characters or graphic forms on paper. After printing is finished, the routine returns to Step s1 and the same steps as mentioned above are repeated.

In the foregoing description, the transitions of page state are limited as an example to monochrome binary 16 (FIG. 5), monochrome multi binary 17 (FIG. 5), color binary 18 (FIG. 5) and color multi binary 19 (FIG. 5). However, this invention is not limited to this example. In other words, it is possible to manage the operation by using two states of monochrome and color.

Furthermore, it is possible to manage the operation by using 2 bits, 4 bits and 8 bits for multi binary gradation as different states.

This embodiment has been described using the function blocks installed in the printer controller of a printer. However, this second embodiment is not limited to this example. In other words, the function blocks may be configured individually by hardware.

As has been described, the data processor according to the second embodiment includes a plurality of expansion process parts suitable for printing data reproduction modes from monochrome binary to color multi binary. The expansion process part 22 selects a suitable expansion process part on the basis of page state data. The selected expansion process part expands printing data of intermediate form to printable data. Thus, it is possible to carry out the expansion process at optimum memory utilization rate and processing speed.

Third Embodiment

The object of the printing data processor according to a third embodiment is to add a system management part to the printing data processor according to the second embodiment to enable efficient printing on both sides of paper.

At first, the function of printing on both sides is described with reference to drawings. Both-side printing normally means to print on the front and back sides of a sheet of paper. In this case, a path is required to turn over paper one side of which has been printed (hereafter referred to as a paper inverting path). An example of a method is shown below which is ordinarily employed in a printer with a mechanism wherein there is one sheet of paper on the paper inverting path.

FIG. 9 is a diagram for explaining printing on both sides of paper.

The printing sequence starts with the second page and proceeds to the fourth page, the first page, and the sixth page, the third page and so on.

The important point requiring attention is as follows.

Printing data is sent from the host A in the order beginning with the first page onwards. As shown in FIG. 9, the first page is printed after the second page and the fourth page have been printed. Data on the first page is held in memory until the end of printing on the fourth page. Therefore, data on the first page need not necessarily be expanded immediately after it has been edited by the editing process.

In other words, printing on both sides can be performed efficiently by adjusting timing of the expansion process. The object of the third embodiment is to adjust this timing.

To achieve this object, the data processor according to the third embodiment includes a system management part.

The system management part adjusts timing of the expansion process on the basis of page state data.

For this purpose, the third embodiment is configured as follows.

Figure 10:
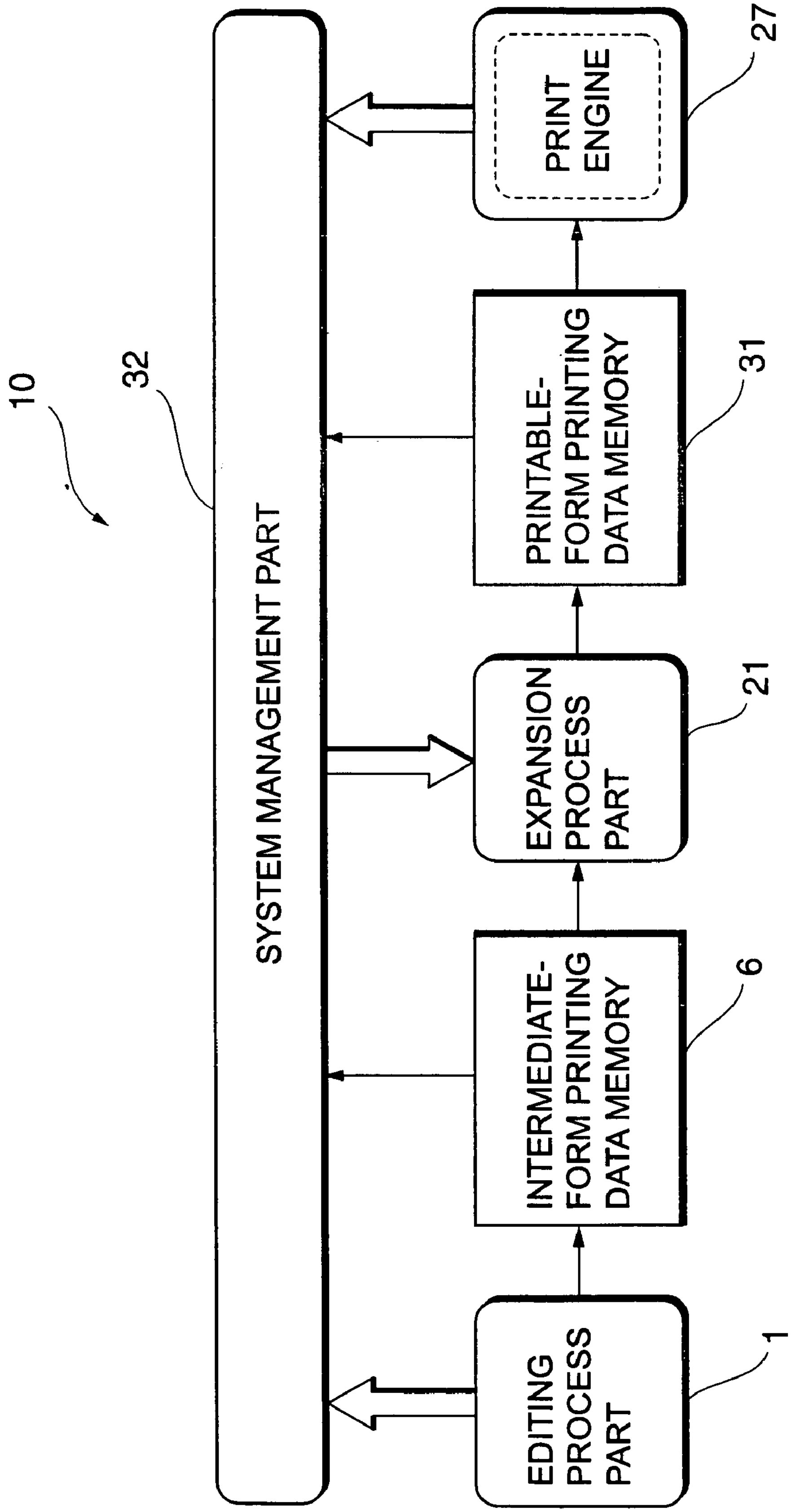
FIG. 10 is a block diagram of a printing data processor according to a third embodiment.

FIG. 10 is a block diagram of the third embodiment of the printing data processor 10 according to the present invention.

The printing data processor 10 in FIG. 10 is installed in the printer controller of a printer and FIG. 10 shows the function blocks of the printing data processor 10. In this example, those function blocks can be realized by modules and objects having the functions corresponding to those in a program in the microprocessor.

The data processor 10 according to the third embodiment comprises an editing process part 1, an intermediate-form printing data memory 6, an expansion process part 21, a printable-form printing data memory 31, and a system management part 32.

The editing process part 1, the intermediate-form printing data memory 6, and the expansion process part 21 are identical with those in the second embodiment, and therefore their descriptions are omitted.

The printable-form printing data memory 31 receives and stores printing data of bit image form from the expansion process part 21.

The system management part 32 decides for each page the amount of memory required to expand printing data of intermediate form to printable data when printing on both sides of paper or printing of multi-page copies. More specifically, the system management part 32 decides the amount of memory used from page state data, that is to say, it decides that the amount of memory used is small when the page state is monochrome, or it decides that the amount of memory used is large when the page state is color. Furthermore, when the page state is monochrome, the system management part 32 lets printing data of intermediate form expanded to printable data and stores the printable data in the printable-form printing data memory 31, and when the page state is color, terminates the editing process with printing data of intermediate form remaining stored in the intermediate-form printing data memory 6 (FIG. 10).

The print engine 27 subordinate to the data processor receives printing data of bit image form, and reproduces images, characters, graphic forms on paper.

Figure 11:
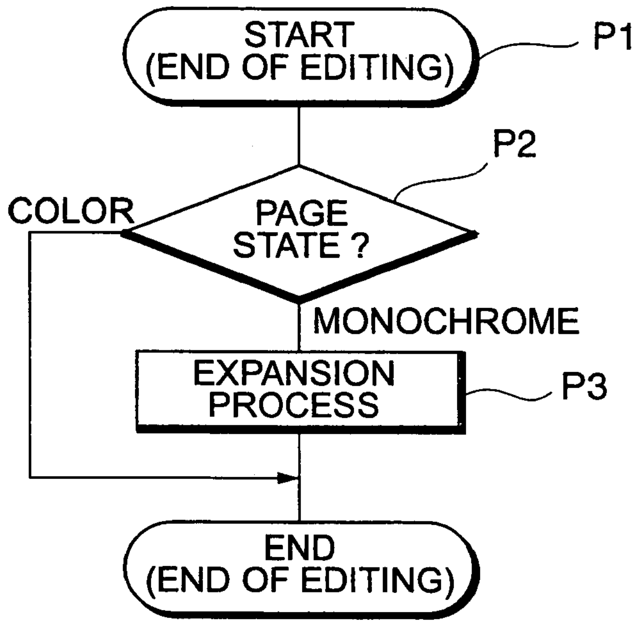
FIG. 11 is a diagram (Part 1) for explaining the operation of the printing data processor according to the third embodiment.

FIG. 11 is a diagram (Part 1) for explaining the operation of the printing data processor according to the third embodiment.

The operation at the stage of the editing process of the printing data processor 10 according to the third embodiment will be described by following Steps P1 to P3 in FIG. 11.

Step P1:

The editing process part 1 (FIG. 10) receives from a host A printing data on a specific page on which a request for printing on both sides has been presented. The editing process part 1 edits printing data of PDL form to provide printing data of intermediate form, and stores printing data of intermediate form and page state data in the intermediate-form printing data memory 6 (FIG. 10). After storage, the editing process part 1 notifies the end of editing to the system management part 32 (FIG. 10).

Step P2:

On receiving notification of the end of editing from the editing process part 1 (FIG. 10), the system management part or readout part 32 (FIG. 10) reads page state data, and proceeds to Step P3 when the page state is monochrome. When the page state is color, the system management part 32 terminates editing with printing data of intermediate form remaining stored in the intermediate-form printing data memory 6 (FIG. 10).

Step P3:

The system management part 32 (FIG. 10) instructs the expansion process part 21 (FIG. 10) to expand printing data of intermediate form to printable data. The expansion process part 21 (FIG. 10) expands printing data of intermediate form to data of printable form, stores the printable-form data in the printable-form printing data memory 31 (FIG. 10), with which editing is terminated.

Figure 12:
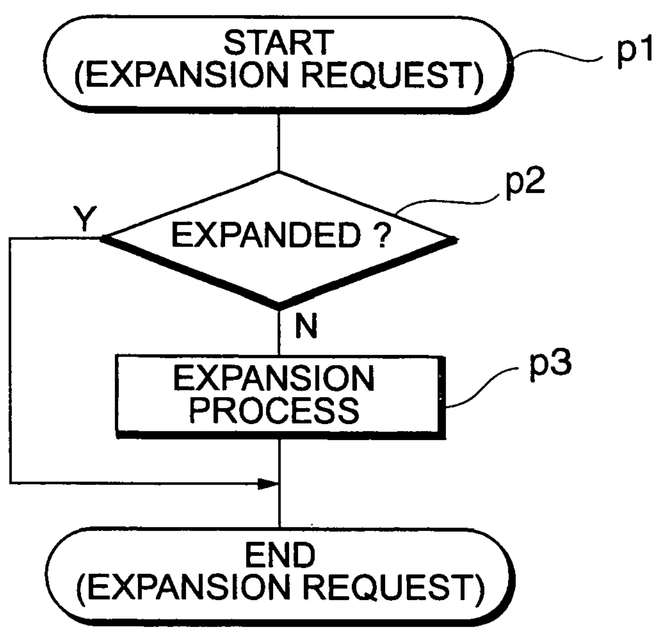
FIG. 12 is a diagram (Part 2) for explaining the operation of the printing data processor according to the third embodiment.

FIG. 12 is a diagram (Part 2) for explaining the operation of the printing data processor 10 according to the third embodiment. The operation after the expansion process of the printing data processor 10 according to the third embodiment will be described by following Steps p1 to p3 in FIG. 12.

Step p1:

The print engine 27 sends notification of an expansion request to the system management part 32 (FIG. 10) when a turn comes around for a specific page to be printed on which a request to print on both sides has been presented.

Step p2:

On receiving the above-mentioned notification, the system management part 32 (FIG. 10) searches the printable-form printing data memory 31 (FIG. 10) to see if data for the specific page has been expanded to printing data of bit image form. If the printing data has not been expanded to a bit image form, the routine proceeds to Step P3, or if the printing data has been expanded to printing data of bit image form, the operation in response to the expansion request is terminated.

Step p3:

The system management part 32 (FIG. 10) instructs the expansion process part 21 (FIG. 10) to execute the expansion process on data on the specific page. The expansion process part 21 (FIG. 10) receives intermediate-form printing data on the specific page from the intermediate-form printing data memory 6 (FIG. 10), and expands this printing data to printing data of bit image form. After this printing data is stored in the printable-form printing data memory 31, the expansion process comes to an end.

After this, the print engine 27 (FIG. 10) reproduces printing data on paper by a normal operation.

By applying this embodiment, printing of multi-page copies can be performed efficiently. What is here called printing of multi-page copies is defined as follows. For example, when printing data of PDL form for a copy consisting of 4 pages is received, data on pages 1 to 4 is reproduced sequentially on paper, and this reproduction operation from page 1 to page 4 is repeated until a required number of copies are printed.

Printing of multi-page copies will be described using a drawing.

Figure 13:
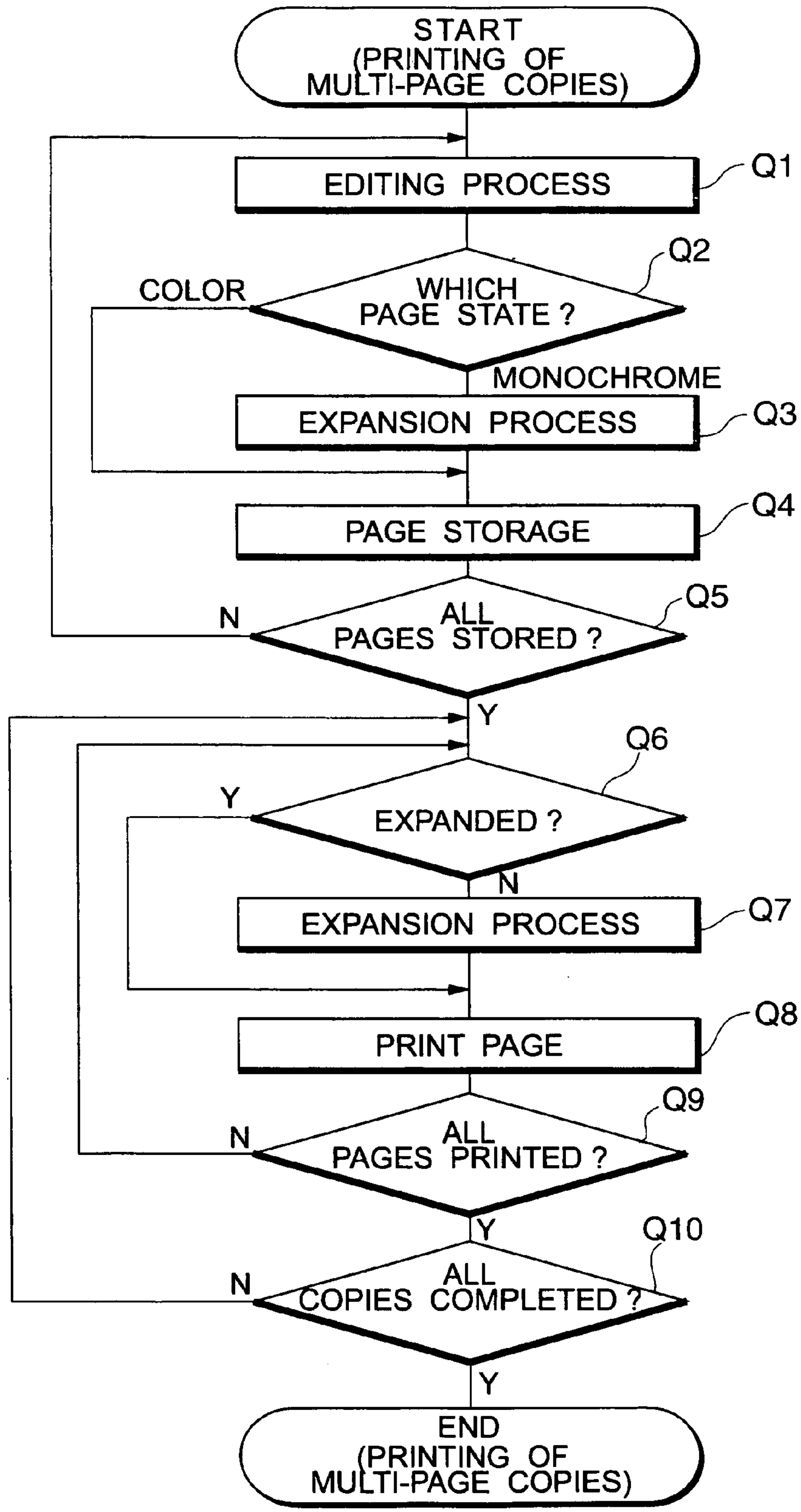
FIG. 13 is a diagram for explaining the operation of printing of multi-page copies.

FIG. 13 is a diagram for explaining the operation of printing of multi-page copies.

The operation of printing of multi-page copies according to the third embodiment by following Steps Q1 to Q10 in FIG. 13.

Step Q1:

The editing process part 1 (FIG. 10) receives from a host A printing data for a plurality of pages on which a request for printing of multi-page copies has been presented. This printing data of PDL form edited to provide printing data of intermediate form, and stores intermediate-form printing data and page state data in the intermediate-form printing data memory 6 (FIG. 10). After storage, the editing process part 1 sends notification of the end of editing to the system management part 32 (FIG. 10).

Step Q2:

On receiving notification of the end of editing from the editing process part 1 (FIG. 10), the system management part 32 (FIG. 10) reads page state data, and when the page state is monochrome, it passes control to Step Q3, and when the page state is color, it passes control to Step Q4 with the intermediate-form printing data remaining stored in the intermediate-form printing data memory 6 (FIG. 10).

Step Q3:

The system management part 32 (FIG. 10) instructs the expansion process part 21 (FIG. 10) to expand printing data of intermediate form to printing data of bit image form. The expansion process part 21 (FIG. 10) expands printing data of intermediate form to printing data of bit image form and stores the bit-image-form printing data in the printable-form printing data memory 31 (FIG. 10), and then the routine proceeds to Step Q4.

Step Q4:

After the system management part 32 (FIG. 10) detects that the intermediate-form printing data has been stored in the intermediate-form printing data memory 6 (FIG. 10) or that the bit-mage-form printing data has been stored in the printable-form printing data memory 31 (FIG. 10), it transfers control to Step Q5.

Step Q5:

After the system management part 32 (FIG. 10) detects that all of a plurality of pages mentioned above have been stored in the intermediate-form printing data memory 6 (FIG. 10) or in the printable-form printing data memory 31 (FIG. 10), it passes control to Step Q6. If all the plurality of pages have not yet been stored, after the system management part 32 causes Steps Q1, Q2 and Q3 to be repeated and all the pages have been stored, it passes control to Step Q6.

Step Q6:

The system management part 32 (FIG. 10) detects whether the above-mentioned plurality of pages have been stored in the intermediate-form printing data memory 6 (FIG. 10) or in the printable-form printing data memory 31 (FIG. 10). If those pages are stored in the intermediate-form printing data memory 6 (FIG. 10), the routine proceeds to Step Q7. If those pages are stored in the printable-form printing data memory 31 (FIG. 10), the system management part 32 passes control to Step Q8.

Step Q7:

The system management part 32 (FIG. 10) instructs the expansion process part 21 (FIG. 10) to expand intermediate-form printing data stored in the intermediate-form printing data memory 6 (FIG. 10). After the expansion process part 21 (FIG. 10) has carried out the expansion process in response to the instruction, the system management part passes control to Step Q8.

Step Q8:

The system management part 32 instructs the print engine 27 (FIG. 10) to reproduce printing data on paper.

The system management part 32 (FIG. 10) detects whether or not all those pages have been reproduced on paper. When it detects that all the pages have been reproduced on paper, the system management part 32 passes control to Step Q10. If all the pages have not been reproduced on paper, the system management part 32 causes Steps Q6, Q7, Q8 and Q9 to be repeated, and after all those pages have been reproduced on paper, it passes control to Step Q10.

Step Q10:

The system management part 32 (FIG. 10) detects whether or not all those pages under request have been reproduced on paper. When it detects that all those pages have been reproduced on paper, it terminates printing of multi-page copies. If all those pages have not been reproduced on paper, it causes Steps Q6, Q7, Q8 and Q9 to be repeated, and after all those pages have been reproduced on paper, it terminates printing of multi-page copies.

In the foregoing description, the amounts of memory used have been decided according to whether the page state is monochrome or color, but this is just one example, and the present invention is not limited to this way of decision.

In other words, it is possible to decide the amount of memory used by varying it according to whether gradation is by binary or multi binary even when the page state is monochrome.

The third embodiment has been described by referring to a case where the function blocks are provided in the printer controller. However, the third embodiment is not limited to this case, but the function blocks may be constructed by hardware.

As has been described, the printing data processor 10 according to the third embodiment comprises a system management part to adjust timing for expanding printing data of intermediate form and therefore provides effects as follows.

1. The amount of memory used, which is required for printing on both sides, can be reduced. Consequently, printing on both sides can be carried out with highest efficiency.
2. The amount of memory used, which is required for printing of multi-page copies, can be reduced. As the result, printing of multi-page copies can be performed with highest efficiency.

Fourth Embodiment

The object of the printing data processor according to a fourth embodiment is to more efficiently change the printing speed of the printing data processor according to the first embodiment, or the second embodiment or the third embodiment.

Figure 17:
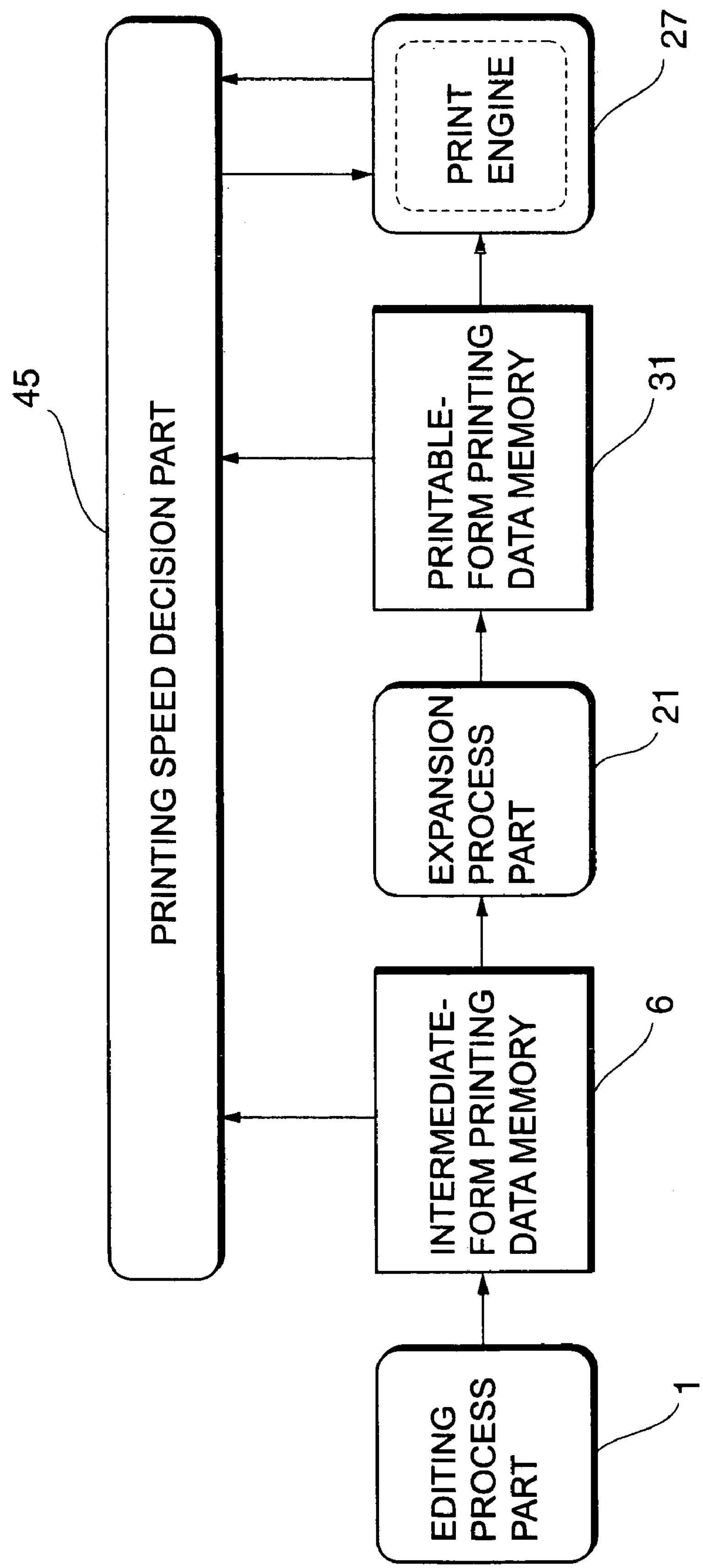
FIG. 17 is a block diagram of a printing data processor according to a fourth embodiment.

To achieve this object, the printing data processor 10 according the fourth embodiment comprises a printing speed decision part 45 (see FIG. 17). This printing speed decision part 45 changes the printing speed on the basis of page state data.

Description will be made of changing the printing speed in ordinary color printers.

In ordinary color printers, the printing speed in color printing is generally slower than the printing speed in monochrome printing. Therefore, it is possible to perform monochrome printing at a printing speed of color printing, but the opposite is impossible (Rule 1). To change the printing speed, it is necessary to eject paper on the printing path beforehand (Rule 2). Those two rules will be described referring to a drawing.

Figure 14A:
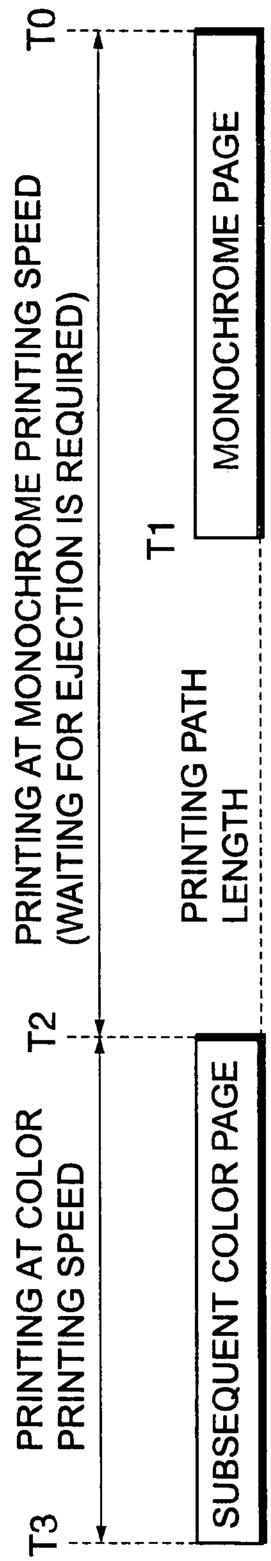
FIGS. 14(*a*) and 14(*b*) are diagrams for explaining the operation of printing speed change-over according to the present invention.
Figure 14B:
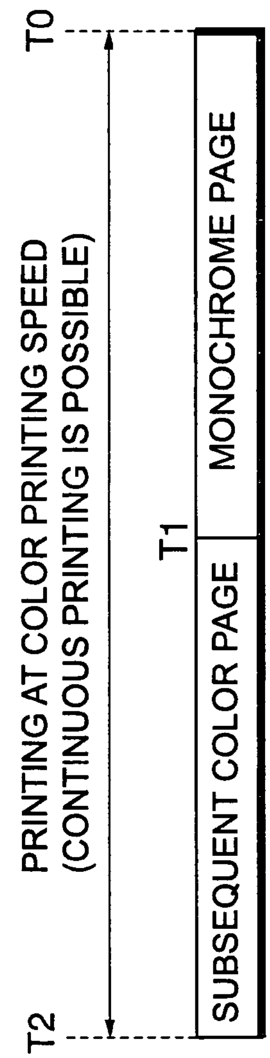

FIGS. 14(*a*) and 14(*b*) are diagrams for explaining the printing speed change-over.

The flow of paper is shown as paper moving to the right, and elapsed time is shown as time passing to the left. At first, a monochrome page is printed, and then a color page is printed.

FIG. 14(*a*) shows an ordinary change-over of printing speed.

Time T0:

Monochrome printing starts at a speed of monochrome printing.

Time T1:

Monochrome printing terminates.

Time T2:

Ejection of the monochrome page is completed, the printing speed changes to speed of color printing, and printing of a color page starts.

Time T3:

Printing of the color page terminates.

As has been described, to change the printing speed, the paper on the printing path has to be ejected. To this end, printing needs to be stopped from time T1 to time T2 (Rule 2). Normally, this period of time corresponds to printing time (printing path) for a sheet of paper.

FIG. 14(*b*) shows a change-over of printing speed specific to the fourth embodiment of the present invention.

Time T0:

Printing of a monochrome page starts at speed of color printing (Rule 1).

Time T1:

Printing of a monochrome page terminates, and printing of a color page starts.

Time T2:

Printing of the color page terminates.

As has been described, because a monochrome page is printed at speed of color printing, it becomes possible to immediately switch to color printing on a color page without waiting for ejection of the monochrome page to terminate. For this reason, it becomes unnecessary to spend printing stoppage time corresponding to a sheet of paper that occurs in the prior art as shown in FIG. 14(*a*). Thus, the object of the fourth embodiment is to decide printing speed this time on the basis of the page state this time and the subsequent page state.

The basic principle of printing speed decision will be described with reference to a drawing.

Figure 15:
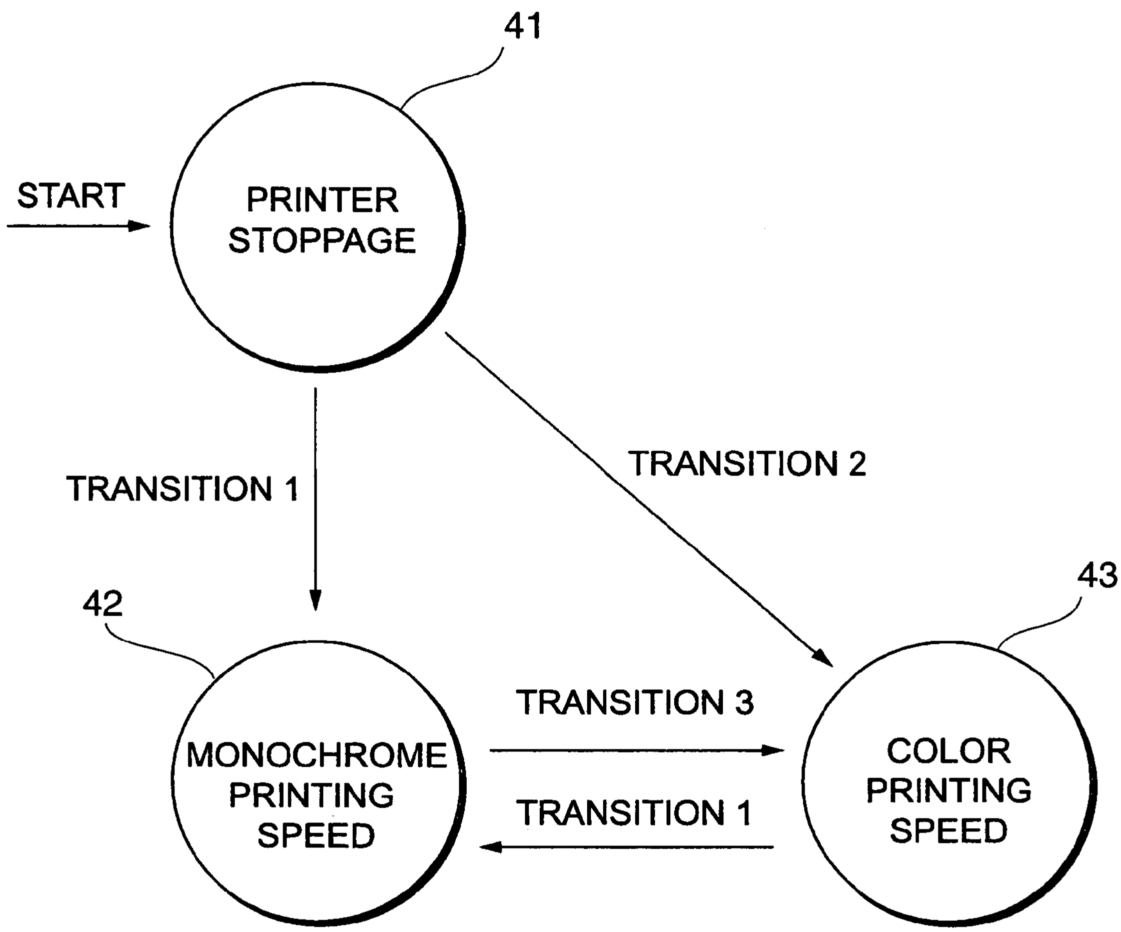
FIG. 15 is a diagram of stage transitions between printing speeds.

FIG. 15 is a diagram of state transitions between printing speeds.

FIG. 15 shows three speed areas, that is, printer stoppage 41, monochrome printing speed 42, and color printing speed 43. State transitions from one speed area to another speed area are classified into three kinds:

Transition 1—a case where the page state this time is monochrome and the next page state is monochrome.

Transition 2—a case where the page state this time is color and the next page state is color.

Transition 3—a case where the page state this time is color.

When transition occurs between monochrome printing speed 42 and color printing speed 43, namely, in transition 3, as explained in FIG. 14(*a*), to change over printing time, it is necessary to provide printing stoppage time corresponding to printing time (printing path) for a sheet of paper.

FIG. 16 is a diagram for explaining decision on printing speed.

FIG. 16 shows an example of material for deciding printing speed, previously prepared on the two rules mentioned above.

The titles of the columns are, from the leftmost one, current printing speed, page state this time, next page state, printing speed this time, and mode of transition.

The current printing speed indicates the speed of the printer just before a transition takes place. In other words, the current printing speed indicates in which state the printer is in, that is, in printer stoppage 41, monochrome printing speed 42 or color printing speed 43 in FIG. 15 just before a transition occurs.

The printing speed this time indicates the speed of the printer after a transition took place. In other words, it indicates into which state printer the printer went, namely, into stoppage 41, monochrome printing speed 42 or color printing speed 43 in FIG. 15.

The kind of transition indicates into which mode of transition the transition from the current printing speed to the printing speed this time falls, transition 1, transition 2 or transition 3.

Note that there are 12 kinds of changes from the page state this time to the next page state, that is, 12 states (1) to (12) as shown in the table.

Description will be made of some examples out of 12 states (1) to (12).

As the First Step, a case is taken up where the current printing speed in FIG. 16 is printer stoppage 41 (FIG. 15) and the page state this time is "monochrome" and the next page state is "monochrome". This condition corresponds to (1) out of 12 states. This case is transition 1 and "monochrome" is written in the space under the printing speed this time. Therefore, the page state proceeds to monochrome printing speed 42 (FIG. 15) and printing terminates with "monochrome" set in the space under the page state this time. This condition at the end of printing is called the Second Step.

In the Second Step, the current printing speed is monochrome printing speed 42 (FIG. 15) and the page state this time is "monochrome". This page state of "monochrome" is the same as the next page state in the First Step. Suppose that it was detected that the next page state is also "monochrome". This condition corresponds to (5) in 12 states, and the printer is in no transition mode. In other words, because the printing speed this time is monochrome, the current monochrome printing speed 42 (FIG. 15) remains unchanged, and printing by the page state this time of "monochrome" takes place and terminates. The condition at the end of printing is called the Third Step.

In the Third Step, the current printing speed is "monochrome printing speed 42" (FIG. 15) and the page state this time is "monochrome". This page state of "monochrome" is the same as the next page state in the Second Step. Suppose that it was detected that the next page state is "color". This condition corresponds to (6) in the 12 states, and therefore the printer is in "no transition" mode as shown in the table. In other words, because the printing speed this time is monochrome, the current monochrome printing speed 42 (FIG. 15) remains unchanged, and printing by the page state this time of "monochrome" terminates. The condition at the end of printing is called the Fourth Step.

In the Fourth Step, the current printing speed is "monochrome printing speed 42" (FIG. 15) and the page state this time is "color". This page state of "color" is the same as the next page state in the Third Step. Suppose that it was detected that the next page state is "color". This condition corresponds to (8) in the 12 states, and the printer is in transition 3 mode. This transition 3 occurs between "monochrome printing speed 42" and "color printing speed 43". Therefore, to change over printing speed, it is necessary to provide printing stoppage time corresponding to printing time (printing path) for a sheet of paper. After the end of printing stoppage time, the printing speed is changed over to color printing speed 43. Printing by the page state this time of color takes place and terminates. The condition at the end of printing is called the Fifth Step.

In the Fifth Step, the current printing speed is "color printing speed 43" (FIG. 15), and the page state this time is "color". This page state of "color" is the same as the next page state in the Fourth Step. Suppose it was detected that the next page state is "monochrome". This condition corresponds to (11) in the 12 states. The printer is in no transition mode. In other words, because the printing speed this time is color, the current color printing speed 43 (FIG. 15) remains unchanged, and printing by the page state of color takes place and terminates. The condition at the end of printing is called the Sixth Step.

In the Sixth Step, the current printing speed is "color printing speed 43" (FIG. 15), and the page state this time is "monochrome". This page state of "monochrome" is the same as the next page state in the Fifth Step. Here, it was detected that the next page state is "color". This condition corresponds to (10) in the 12 states. The printer is in no transition mode. In other words, because the printing speed is "color", "current color printing speed 43" (FIG. 15) remains unchanged, and printing by the page state this time of "monochrome" takes place and terminates. This condition is shown in the diagram for explaining printing speed change-over in FIG. 14(*b*).

The operations mentioned above take place efficiently according to modes of transition until all pages are printed.

Now that he basic principle of printing speed decision has been described, the configuration of the fourth embodiment will be described.

FIG. 17 is a block diagram of the printing data processor according to the fourth embodiment.

The printing data processor in FIG. 17 is included in the printer controller of a printer, and its function blocks are shown graphically. In this example, those function blocks are realized by modules and objects having the functions corresponding to those in a program in the microprocessor.

The printing data processor 10 in the fourth embodiment comprises an editing process part 1, an intermediate-form data memory 6, an expansion process unit 21, a printable-form printing data memory 31, and a printing speed decision part 45.

Only differences from the third embodiment will be described in the following.

The printing speed decision part 45 detects the page state this time and the next page state by data from the intermediate-form printing data memory 6. The printing speed decision part 45 detects the current printing speed from a signal from the print engine 27, decides a printing speed this time according to a decision standard, shown in FIG. 18, which is based on detection results of pages states mentioned above, and specifies a printing speed to the print engine 27. The printing speed decision part 45 contains, for example, material for decision shown in FIG. 16.

The print engine 27, a part subordinate to this printing data processor, reproduces images on paper at a printing speed specified by the printing speed decision part 45.

The other parts are the same as those in the third embodiment and their descriptions are omitted.

Figure 18:
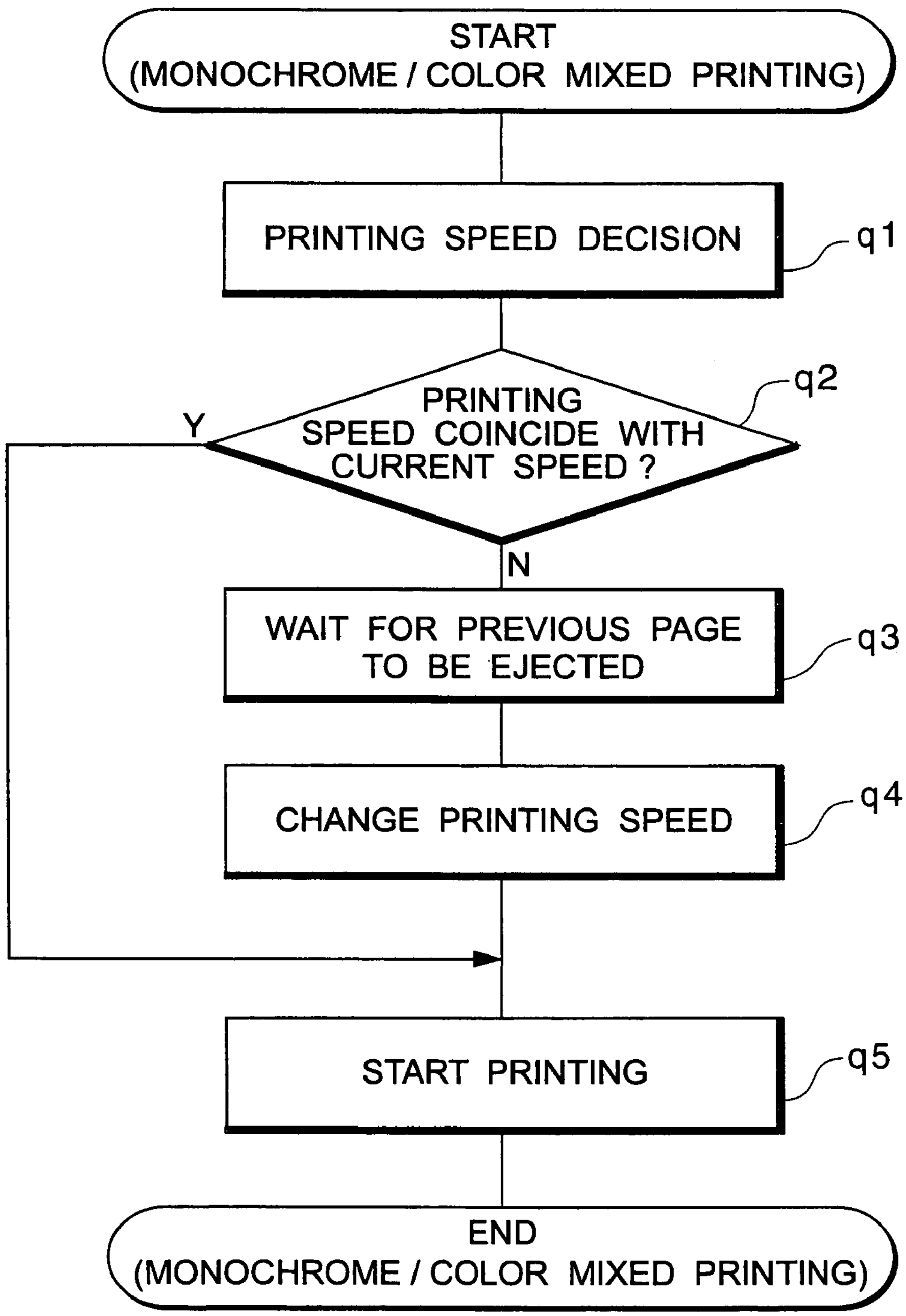
FIG. 18 is a diagram for explaining the operation of the fourth embodiment.

FIG. 18 is a diagram for explaining the operation of the fourth embodiment.

The operation of the printing data processor 10 according to the fourth embodiment will be described following Steps q1 to q5 in FIG. 18.

Step q1:

The printing speed decision part 45 (FIG. 17) detects the page state this time and the next page state by data from the intermediate-form printing data memory 6 (FIG. 17). The printing speed decision part 45 detects the current printing speed from a signal from the print engine 27, and decides a printing speed this time according to decision material (FIG. 16) based on detection results mentioned above.

Step q2:

When the printing speed decision part 45 (FIG. 17) decides that the printing speed this time is the same as the current printing speed, this routine proceeds to Step q5. If the printing speed decision part 45 (FIG. 17) decides that the printing speed this time is not the same as the current printing speed, the routine proceeds to Step q3.

Step q3:

The printing speed decision part 45 (FIG. 17) instructs the print engine 27 (FIG. 17) to stop printing until the page this time is ejected and there is no paper on the printing path.

Step q4:

After the printing path is cleared of paper, the printing speed decision part 45 (FIG. 17) instructs the print engine 27 (FIG. 17) to change the printing speed.

Step q5:

The printing speed decision part 45 (FIG. 17) instructs the print engine 27 (FIG. 17) to start printing.

The above steps are repeated at the end of printing of each page.

Though description has been made of an example where a printing speed is decided from page states for 2 pages, but the present invention is not limited to this example. More specifically, a printing speed may be decided from many page states at an early stage to thereby achieve better effects.

The foregoing description has been made of a case where the fourth embodiment is employed as function blocks in the printer controller. However, the fourth embodiment is not limited to this case, but the function blocks may be constructed individually by hardware.

By providing the printing speed decision part to decide a printing speed this time from the page state this time and the next page state, printing stoppage time can be reduced and printing efficiency can be improved.

I claim:

1. A printing data processor comprising:

an editing process part that, after having received printing data with page description language (PDL) form output from a host page by page, edits the PDL data into printing data with intermediate form by page unit and analyzes all color data contained in the intermediate data of one page in order to generate page state information corresponding to the one page;

an expansion process part that performs an expansion process with respect to the intermediate data; and an expansion-use-memory that is used by the expansion process while the expansion process is being performed, a real-use-quantity of the expansion-use-memory for the expansion process of one page being set based on the page state information.

2. The printing data processor according to claim 1, wherein the page state information has four different printing modes, in increasing size in terms of memory, including:

a monochrome binary printing mode;

a color binary printing mode;

a monochrome multiple value printing mode; and a color multiple value printing mode.

3. The printing data processor according to claim 1, wherein the editing process part includes:

a decoding process part that separates the printing data output from the host into commands; and a command process part that executes a pre-process with respect to each command output from the decoding part.

4. The printing data processor according to claim 1, wherein the printing data with intermediate form is printing data expressed by display list form.

5. The printing data processor according to claim 1, further comprising:

a reading out part that reads out the page state information in order to control a printing operation depending upon the page state information.

6. The printing data processor according to claim 1, wherein, based on said page state information, a proper process part is selected from a plurality of process parts.

7. The printing data processor according to claim 1, further comprising:

a printing speed decision part for changing printing speed, the printing speed decision part determining printing speed from a judgment result of the page state for a current page being printed and a judgment result of a page following the current page being printed, according to a predetermined decision rule.

8. The printing data processor according to claim 7, wherein the printing speed of color is slower than the printing speed of monochrome.

9. The printing data processor according to claim 8, wherein following a monochrome printing, if a color printing will be performed, the printing speed of the monochrome printing is set to the printing speed of color.

10. The printing data processor according to claim 7, wherein the printing speed is based on whether the printing data is color data or monochrome data.

11. The printing data processor according to claim 10, wherein if monochrome data and color data are intermingling in printing data of one page, the printing speed is based on the printing speed of color.

12. The printing data processor according to claim 1, wherein the page state information indicates whether the one page requires color printing or monochrome printing.

13. The printing data processor according to claim 1, wherein if the all color data include data indicating color and data indicating monochrome, the page state information is set to indicate color printing; and if the all color data only include data indicating monochrome, the page state information is set to indicate monochrome printing.

14. The printing data processor according to claim 1, wherein if the page state information indicates that the one page is monochrome printing, the real-use-quantity is set to a smaller size than when the page state information indicates that the one page is color printing.

15. The printing data processor according to claim 1, wherein the real-use-quantity corresponding to monochrome printing generally is one quarter of that corresponding to color printing.

16. The printing data processor according to claim 1, wherein the page state information is added into the corresponding intermediate data.

17. A printing data processor comprising:

an editing process part that, after having received printing data with page description language (PDL) form output from a host page by page, edits the PDL data into printing data with intermediate form by page unit and analyzes all color data contained in the intermediate data of one page in order to generate page state information corresponding to the one page;

an expansion process part that performs an expansion process to expansively process the intermediate data into printable data corresponding to every page;

an intermediate data memory that stores the intermediate data;

a printable data memory that stores the printable data;

a system management part that, when the page state information indicates that the corresponding page is color printing, makes the intermediate data memory store the corresponding intermediate data and, when the page state information indicates that the corresponding page is monochrome printing, makes the expansion process part perform the expansion process and makes the printable data memory store the corresponding printable data.

18. The printing data processor according to claim 17, wherein all of the expansion processes corresponding to monochrome printing pages are performed prior to executing printing and all of the expansion processes corresponding to color printing pages are performed while executing printing.

19. A printing data processor comprising:

an editing process part that, after having received printing data with page description language (PDL) form output from a host page by page, edits the PDL data into printing data with intermediate form by page unit and analyzes all color data contained in the intermediate data of one page in order to generate page state information corresponding to the one page;

an expansion process part that performs an expansion process to expansively process the intermediate data into printable data corresponding to every page;

an intermediate data memory that stores the intermediate data;

a printable data memory that stores the printable data;

an expansion-use-memory that is used by the expansion process while the expansion process is performed;

a system management part that sets the real-use-quantity of the expansion-use-memory for the expansion process of one page based on the page state information; when the page state information indicates that the corresponding page is color printing, makes the intermediate data memory store the corresponding intermediate data; and when the page state information indicates that the corresponding page is monochrome printing, makes the expansion process part perform the expansion process and makes the printable data memory store the corresponding printable data.

20. The printing data processor according to claim 19, wherein all of the expansion processes corresponding to monochrome printing pages are performed prior to executing printing.

21. The printing data processor according to claim 19, wherein all of the expansion processes corresponding to monochrome printing pages are continuously performed prior to executing printing, and the expansion-use-memory is used once for four monochrome printing pages.

* * * * *